United States Patent [19]

Forker

[11] Patent Number: 5,359,925
[45] Date of Patent: Nov. 1, 1994

[54] APPARATUS FOR PRODUCING AN EDIBLE SANDWICH

[76] Inventor: Joel C. Forker, 1643 Ocean Blvd., Rye, N.H. 03870

[21] Appl. No.: 87,205

[22] Filed: Jul. 2, 1993

Related U.S. Application Data

[63] Continuation-in-part of Ser. No. 770,984, Oct. 1, 1991, abandoned.

[51] Int. Cl.⁵ .............................. A21C 9/06; A23L 1/00
[52] U.S. Cl. ................................... 99/450.8; 99/450.4; 99/494; 99/532
[58] Field of Search ................. 99/450.1, 450.2, 450.4, 99/450.5, 450.7, 450.8, 494, 532, 533; 426/281–283, 284, 92, 94, 143; 425/138, 130, 383

[56] References Cited

U.S. PATENT DOCUMENTS

| | | | |
|---|---|---|---|
| 3,161,154 | 12/1964 | Schott | 99/450.8 |
| 3,923,437 | 12/1975 | Gahagan | 425/130 |
| 4,543,053 | 9/1985 | Jasniewski | 425/383 X |
| 4,703,688 | 11/1987 | Ochs | 99/494 X |
| 4,752,488 | 6/1988 | Hayashi et al. | 426/281 |

FOREIGN PATENT DOCUMENTS

2062436  5/1981  United Kingdom ............... 99/450.5

*Primary Examiner*—Timothy F. Simone
*Attorney, Agent, or Firm*—William B. Ritchie

[57] ABSTRACT

An apparatus for producing an edible sandwich having a cavity with uniform thickness of bread surrounding the cavity. Edible filler material is injected into the cavity that has a self-sealing entrance. The apparatus forms the sandwich by first making a keyhole shape slit in the bread casing. Then an expandable mandrel is inserted into the slit and expanded by filling it with air. As the mandrel expands, it compresses the bread in the casing to form a cavity having walls of substantially uniform thickness throughout. An edible filling is then inserted into this cavity via the slit previously formed.

4 Claims, 7 Drawing Sheets

APPARATUS FOR PRODUCING AN EDIBLE SANDWICH

This application is a continuation-in-part of U.S. patent application Ser. No. 07/770,984, filed Oct. 1, 1991, now abandoned.

BACKGROUND OF THE INVENTION

1. Field of the Invention

The invention relates to apparatus for producing edible sandwiches, i.e. an edible food item comprising a split bread roll or two spaced bread slices and the intervening filling sandwiched therebetween, said food item being adapted to be grasped and eaten without the use of eating utensils.

2. Description of the Related Art

Conventional edible sandwiches often include two slices of bread and an intervening edible filling, which can include a variety of different substances, e.g. peanut butter, jelly, bacon, lettuce, tomato, hamburger or hot dog, etc. As a variation, the two slices of bread can be replaced by a split hamburger bun or a split hot dog bun.

One disadvantage of the conventional sandwich bread configuration is that it is less than ideal for all types of fillings. Some types of filings can squeeze out from between the bread halves while being grasped, due to low friction within the filling itself, which makes it too fluid. Examples of such low friction or fluid fillings are egg salad or meatballs with tomato sauce.

Another disadvantage of conventional sandwiches made with slices of bread is that the filling can leak through the porous bread material or weaken the strength of the bread to a point where the bread may fall apart.

A further disadvantage of conventional sandwiches is the fact that if the filling is a hot edible material, e.g. a hamburger or hot dog, heat may escape from the filling through the perimeter space between the two bread sections, thereby undesirably lowering the temperature of the filling. A somewhat similar situation exists with regard to cold sandwiches, i.e. undesired entry of heat into the cold filling.

An additional disadvantage of certain conventional sandwiches is a perceived difficulty in holding the sandwich in one hand. Unless the person has a large hand the grip on the bread slices may be so localized or oriented that the filling squirts out of the sandwich or the bread slices slide apart. This difficulty may be especially the case when the person holding the sandwich is a small child.

SUMMARY OF THE INVENTION

It is an object of the invention to provide an apparatus for creating quickly and conveniently a uniform cavity in a soft bread roll.

It is another object of the invention to provide an apparatus for creating a cavity which has uniform wall thickness within a soft bread roll.

It is another object of the invention to provide an apparatus for creating a cavity within a soft bread roll having walls of compressed bread.

Still another object of the invention is to provide an apparatus for creating a small keyhole shaped slit in a soft bread roll as the entry point into which a variety of sandwich foodstuffs can be inserted.

Yet another object of the invention is to provide an apparatus which can easily and directly insert foodstuffs into a bread roll.

This invention is an apparatus for making an edible sandwich from a one piece pre-baked soft bread casing having two major faces, a soft core, a peripheral edge and a cavity. The apparatus includes a circular knife blade wheel guided by at least one cam surface in a track. The track and cam surface is dimensioned to cut a planar keyhole shape slit extending from the periphery of the pre-baked soft bread casing.

In addition, the apparatus also includes an expandable mandrel dimensioned to fit within the slitted portion of the periphery of the casing. The mandrel consists of a flat circular bladder with a sealed bonded connection to a flat tube. The circular bladder is dimensioned to form in its expanded state a shape corresponding to the major faces and peripheral edge of the bread casing. A means is provided for pumping air into the mandrel so that it will expand and form a cavity having a substantially uniform wall thickness. The cavity created by the expansion of the mandrel will be centered approximately between the two major faces of the bread casing. Lastly, a flexible air hose with two ends, one end attached to a flat tube and the other end attached to a pumping mechanism, provides the means for expanding the circular bladder.

DETAILED DESCRIPTION OF THE INVENTION

Figure 1:
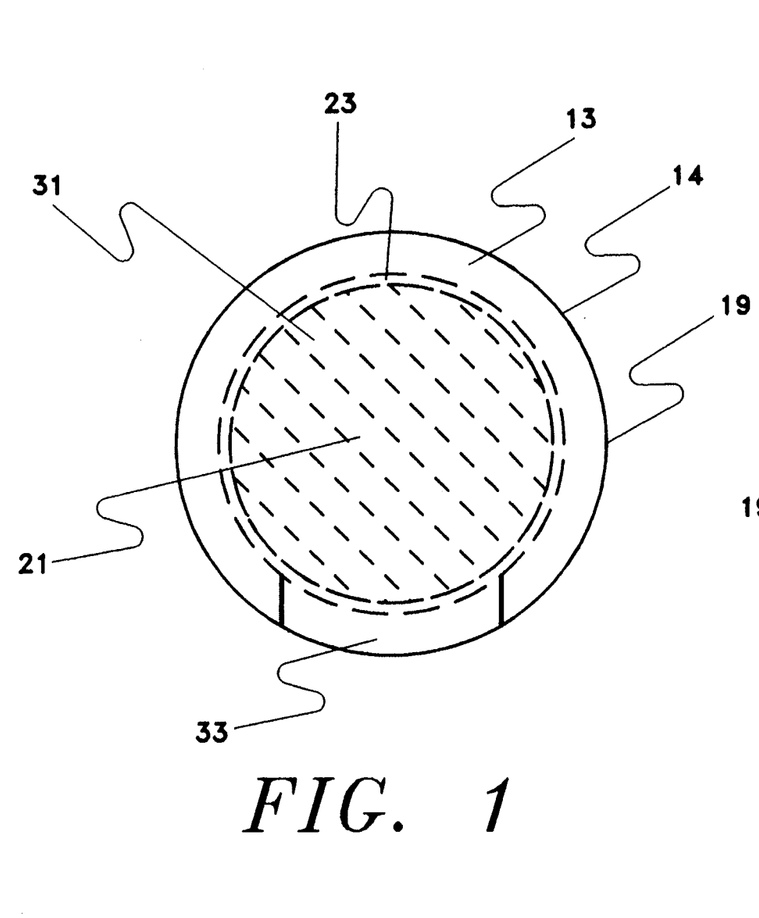
FIG. 1 is a plan view of a sandwich produced by the present invention.

FIG. 1 is a plan view of a sandwich embodying the present invention.

Figure 2:
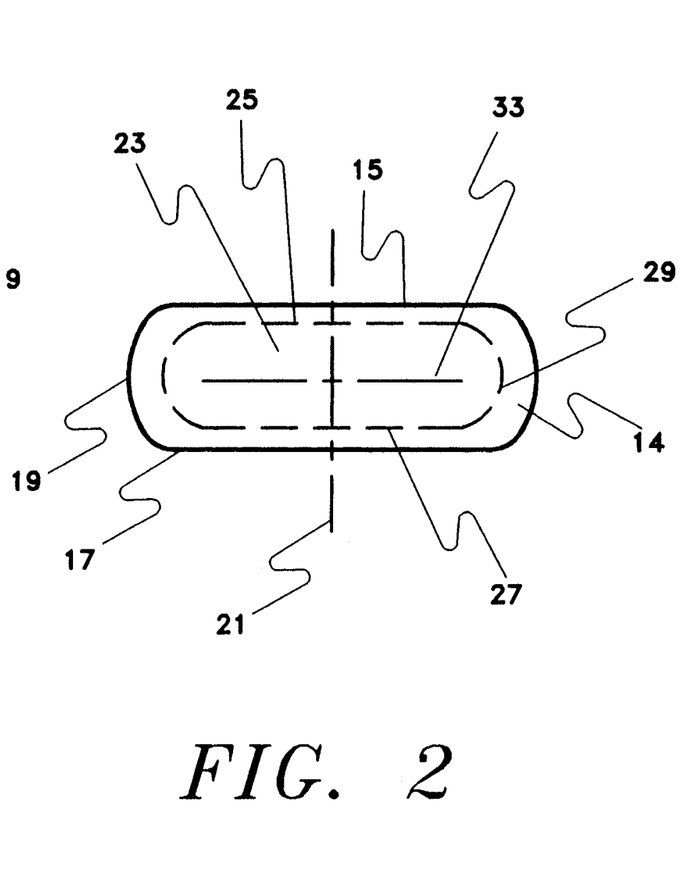
FIG. 2 is a side elevation view of the FIG. 1 sandwich.

FIG. 2 is a side elevation view of the FIG. 1 sandwich.

FIGS. 1 and 2 illustrate the novel edible sandwich 14 that is produced by the invention. Sandwich 14 comprises a one piece baked bread casing 13 having an outer surface defined by spaced major faces 15 and 17, and a peripheral edge 19 interconnecting said major faces. As viewed in FIG. 1, the casing has a circular shape centered on a central axis 21; edge 19 is circular in the major plane of the casing (FIG. 1). As viewed in FIG. 2, peripheral edge 19 has an oval profile configuration taken in a radial plane passing through central axis 21.

Casing 13 has a circular slab shape having the appearance of a thickened pancake. The sandwich casing can be of various different dimensions. However, in a preferred form the casing will have a diameter of about five inches, and a thickness (along axis 21) of about one and one half inches.

Formed within sandwich casing 13 is a hollow circular cavity 23. The cavity is symmetrical around central axis 21, and equidistant from the casing major faces 15 and 17. As viewed in FIG. 2, the cavity is defined by an internal roof surface 25, an internal floor surface 27, and an internal peripheral surface 29. The wall thickness surrounding cavity 23 is substantially uniform, that is, the outer perimeter of cavity 23 is essentially the same shape as the outer perimeter of sandwich 14.

Casing 13 is made from a readily available, commercially made pre-baked slab-like bread roll having a crusty outer surface layer and inner soft bread core. The bread roll is commonly formed out of bread dough and baked to the slab like outer configuration shown in FIGS. 1 and 2. Cavity 23 is formed within the bread roll by the unique process described herein after the bread roll has been baked. The bread that occupies the volume between the cavity 23 and the outer crust 19 is soft, but more compressed and dense than the original bread core. This is a result of the cavity forming process described herein in which the soft inner bread core is displaced outward from the center and compressed against the outer crust layer of the bread roll. This is in contrast to an alternate, more obvious and common cavity forming process in which the inner core bread might be removed or compressed in an uneven manner so that the cavity and surrounding wall of compressed bread lacks uniformity.

The cavity 23 is at least partially filled with an edible filling designated by numeral 31. Various different edible hot or cold substances with different physical textures can be used for filling 31. For example, meat balls with tomato sauce or tuna fish salad or any fluid "plastic" product with integral pieces up to about one inch in diameter may be used as filling. In order to introduce the filling into cavity 23, the sandwich casing has a thin linear slit 33 extending from its outer edge 19 to inner cavity surface 29. Slit 33 is normally in a closed condition wherein the slit surfaces are engaged together to preclude escape of the filling material from cavity 23.

Cavity 23 is formed by a two step process. First, a thin slit is formed in the original bread roll to the "keyhole" configuration shown in FIG. 1 (the combined projected planar shape of 23 and 33). Second, an expandable mandrel is inserted into the slit and then expanded to displace the soft bread core outward into the final cavity configuration shown in plan and elevation in FIGS. 1 and 2 respectively. These two operations are performed in one device in successive steps.

Figure 3:
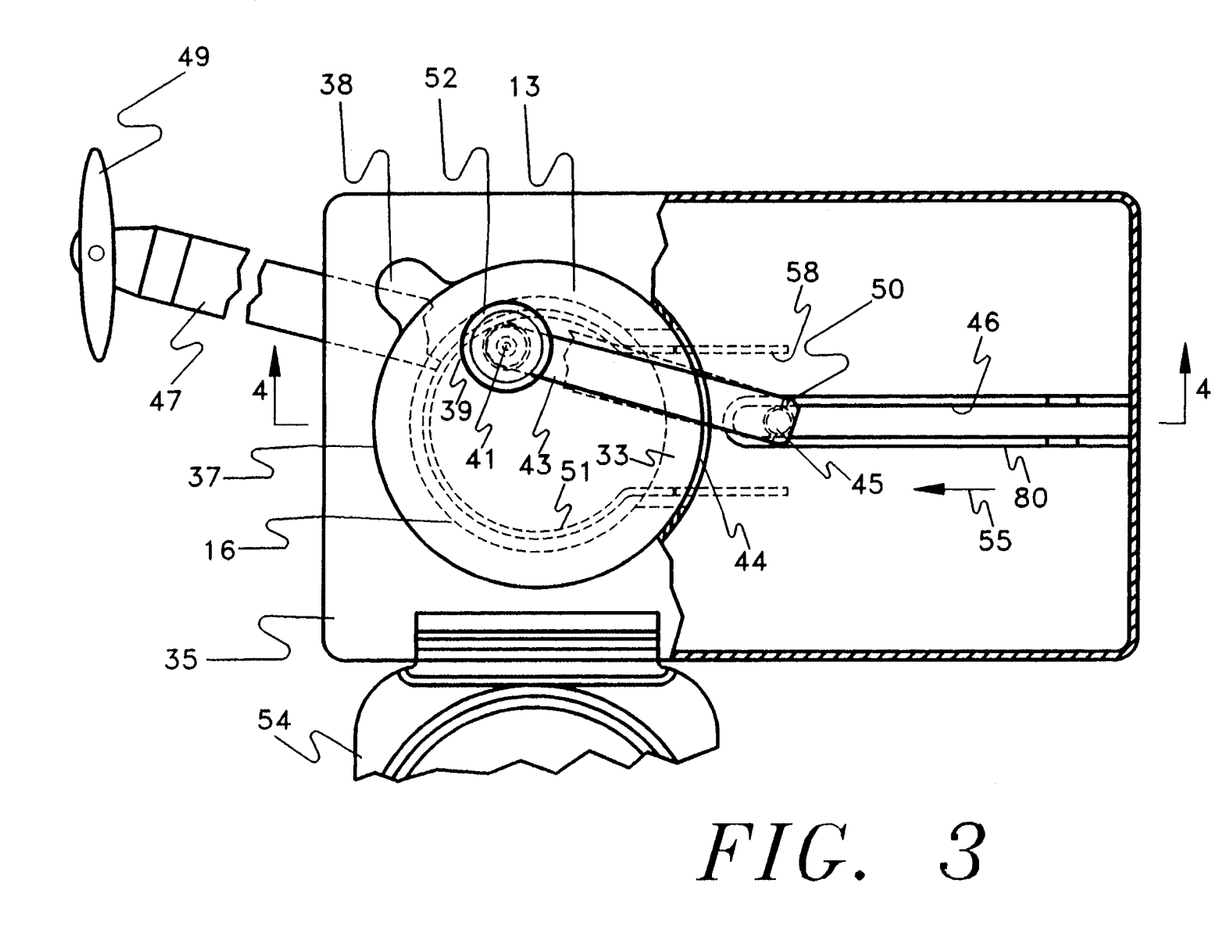
FIG. 3 is a plan view of the apparatus embodying the present invention and showing the cutting components that are used to form the slit in the sandwich casing that constitutes a component part of the FIG. 1 sandwich.
Figure 4:
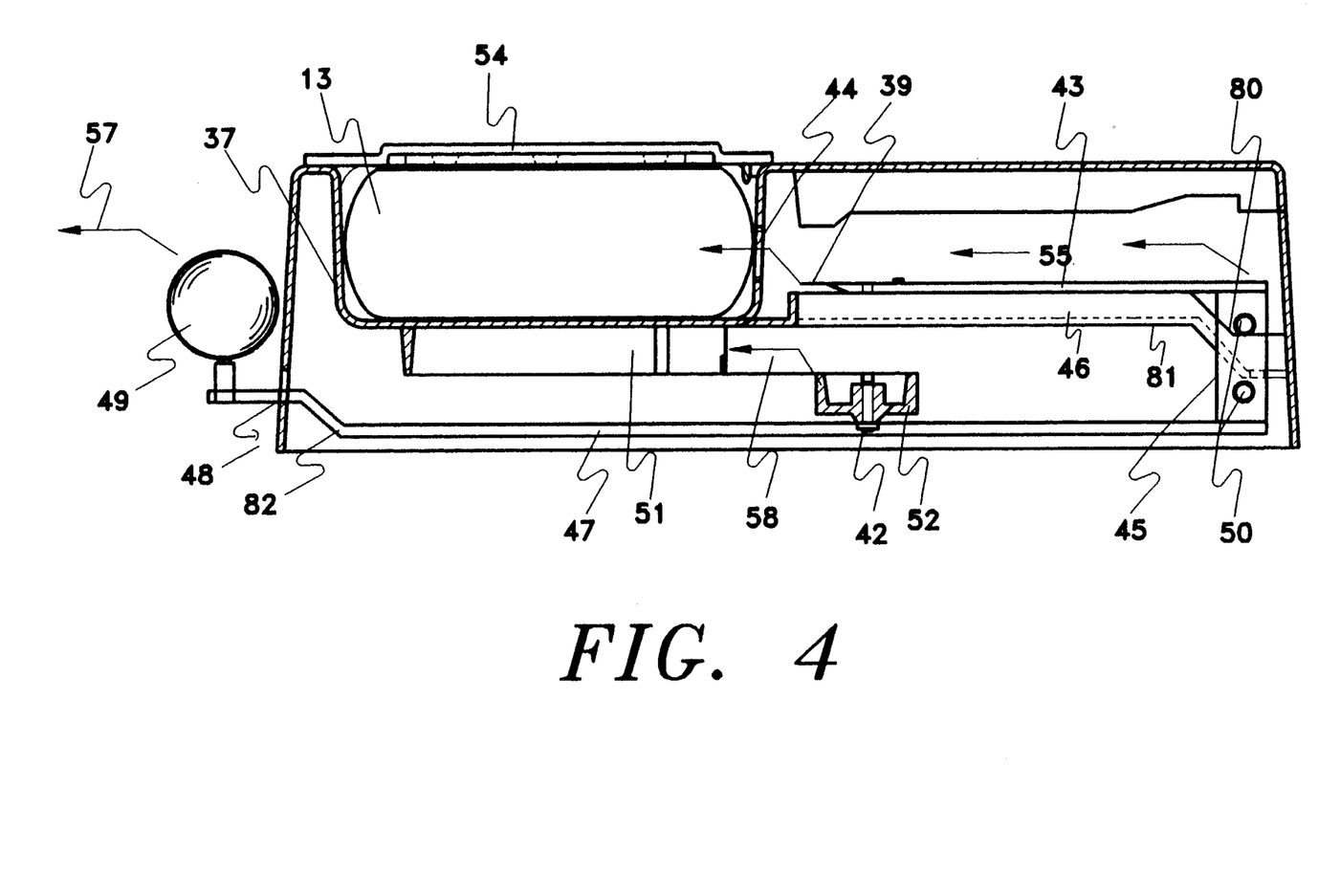
FIG. 4 is a partial sectional elevation view taken on line 4-4 of the same cutting apparatus in FIG. 3.

FIGS. 3, 4, 5, 6, 7, and 8 show the device for creating the cavity 23 and embodying the present invention. FIGS. 3 and 4 show a housing 35 and the cutting apparatus that is used to first form the thin slit. FIGS. 5, 6, 7, and 8 is the same housing 35 as in FIGS. 3 and 4, but with the cutting apparatus omitted from view and the expansion apparatus shown which is used to for forming the cavity after the slit is made.

FIG. 3 is a plan view of the device with the cutting apparatus that is used to form the food-insertion slit in the casing that constitutes a component part of the FIG. 1 sandwich.

FIG. 4 is a sectional view taken on line 4–4 in FIG. 3.

Referring to FIGS. 3 and 4, there is shown a stationary housing 35 that defines a circular seat 37 for the baked bread roll. A small circular cutter blade 39 has a rigid connection 41 with a flat arm 43. A rod 45 is rigidly connected to 43 and extends downward through slot 46 in the housing 35 and is rigidly connected to a second flat arm 47. Integral with housing 35 is a horizontal cam surface 51 with a "keyhole" configuration. A roller-type cam follower 52 is attached to lower arm 47 for movement along cam surface 51. Attached to rod 45 are two pin-type cam followers that move along upper and lower cam faces 80 and 81 respectively of slot 46. Rod 45 is allowed to rotate within slot 46 as well as move along slot 46 in direction 55 or reverse. Lower arm 47 rests on slot 48 and has an offset bend 82. The contour of offset 48 and cam surface 80 is such that as handle 49 is pulled in the forward direction 55, the entire rigid cutter arm assembly initially moves up as well as forward as shown by arrow 57. This guided motion moves the cutter blade 39 and arm 43 through slot 44 in seat 37 without contact with seat 37.

Straight cam surface 58 is wide enough to allow cam 52 and cutter 39 to move in a restricted left-right sawing motion normal to direction 55 as the cutter 39 moves forward through slot 44. This left-right sawing motion facilitates the making of the straight cut 33 shown in FIG. 1 as the cutter 39 penetrates the outer crust 19 of casing 13. Once the cutter 39 is entirely within bread casing 13, the cam surface 51 widens into a circular path to allow the cam follower 52 and cutter 39 to be moved in a full orbital path to make the cut 16. The contour of cam surface 51 determines the limits of motion of handle 49 and cutter blade 39. Cutter blade 39 is enabled to form the keyhole-shaped slit in the bread roll without cutting through the casing outer crust except at the slit entrance area 33.

After the keyhole slit 16 is created in the casing, the cutter arm assembly is returned to its rest position by pushing handle 49 in the reverse of direction 55. When fully retracted, the cam surface 80 and offset 82 allow the arm assembly to move down and away from slot 44 in the reverse direction of arrow 57.

Figure 5:
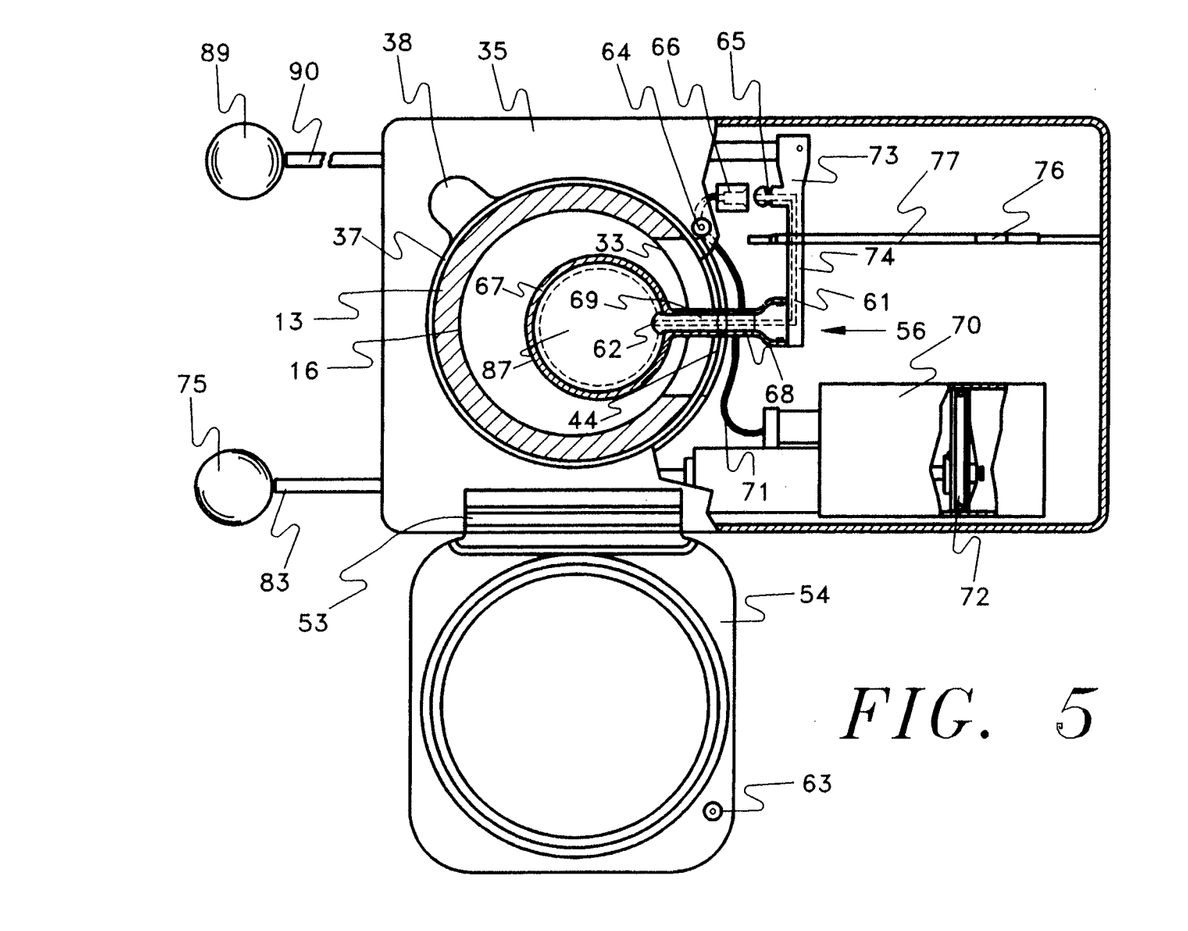
FIG. 5 is a plan view of the same apparatus in FIG. 3 but showing the expansion mandrel components that are used to form the hollow cavity within the FIG. 1 sandwich casing.
Figure 6:
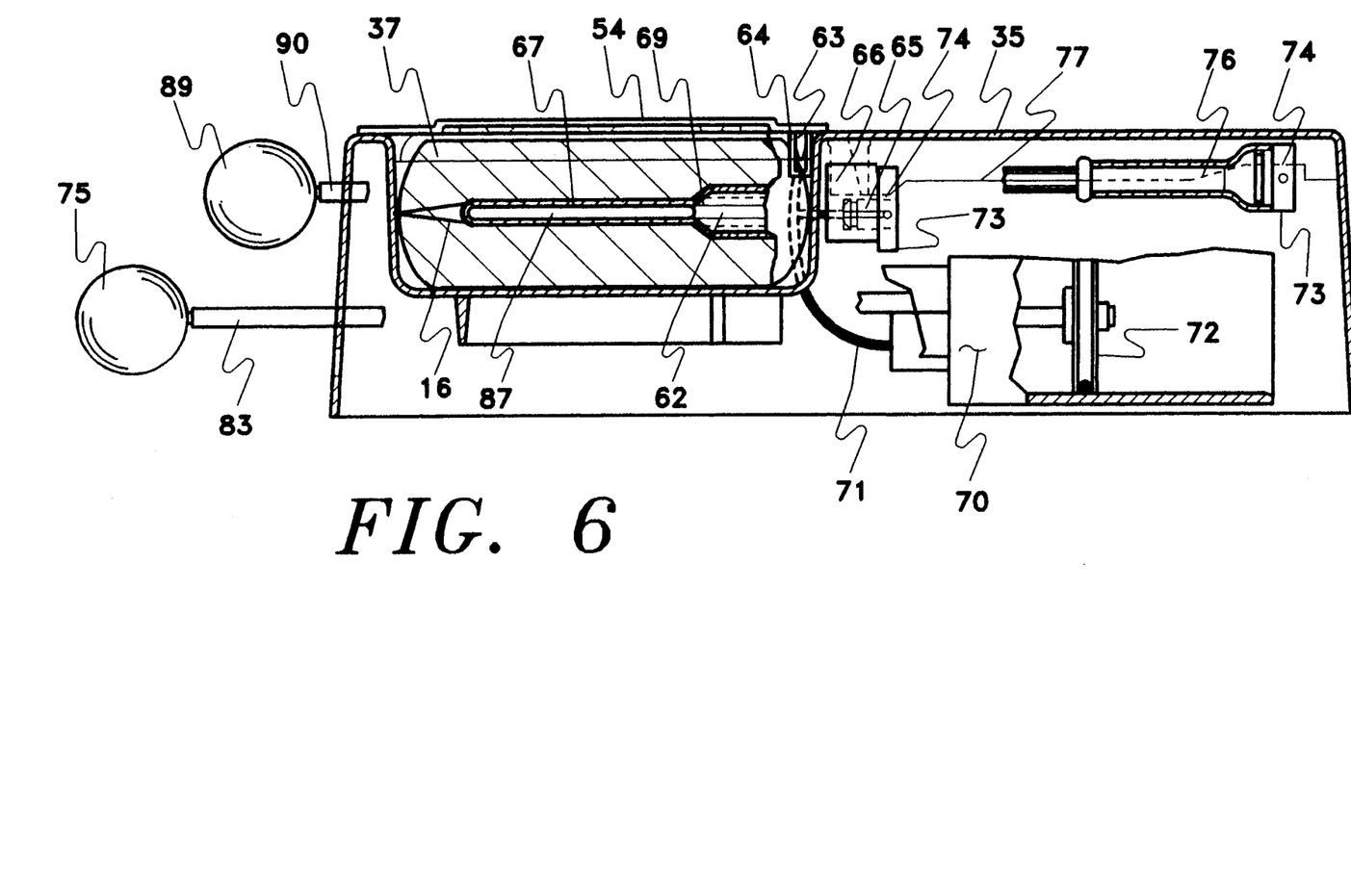
FIG. 6 is a sectional elevation view of the same expansion mandrel apparatus in FIG. 5 but in a different position.

FIG. 5 shows the same apparatus housing 35 as in FIG. 3 except with the cutter apparatus omitted from view and the expansion mandrel apparatus in partially forward position. The mandrel is moved in direction 56 and reverse by handle 89 that is connected in turn to control rod 90 and mandrel arm 73. When the handle is pulled fully forward in direction 56, the center of the circular bladder 67 and support core 87 coincide with the previously cut center area of cut 16 in the bread roll.

Figures 7, 8:
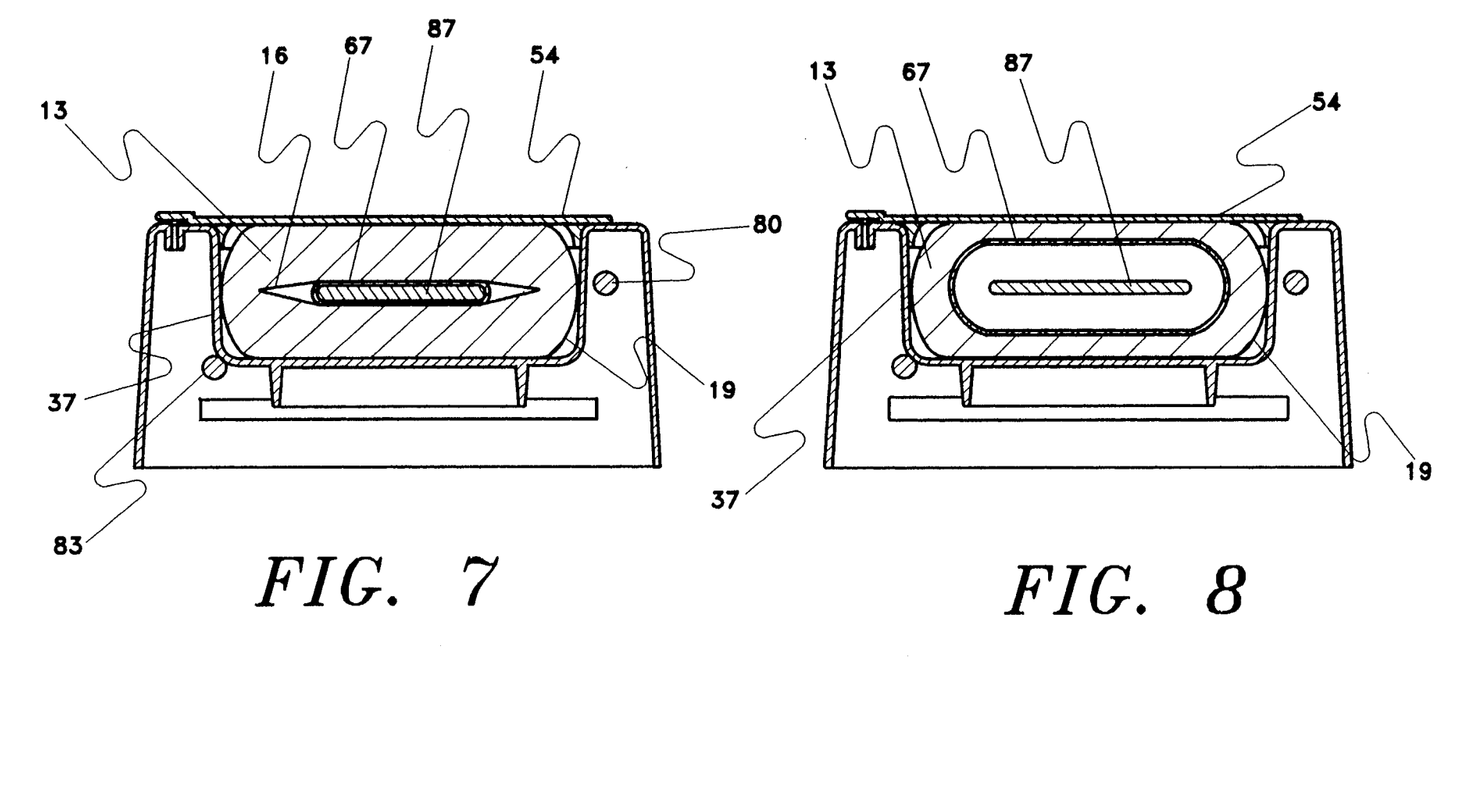
FIG. 7 is a sectional elevation view of the same expansion mandrel from a different view perspective.
FIG. 8 is a view taken from the same perspective as FIG. 7, but with the bladder apparatus in a different condition of adjustment.

FIG. 7 shows a cross sectional end view of the bladder and support core within the slit of the bread roll. At the same time, air stem 65 engages air socket 66. Cover 54 is shown in the open position for clarity. It must now be swung closed about pivot point 53. When fully closed, raised plug 63 engages hole 64 in the top of housing 35. This can be seen in elevation in FIG. 6. Hole 64 is connected to air line 71 which is connected both to air pump 70 and air socket 66. Air can now be pumped into the bladder 67 by pulling on handle 75 which is connected to pump piston rod 83. Piston 72 displaces air into hose 71, through socket 66, stem 65, internal air passages 61 and 62 in mandrel arm 73 and support core 69 respectively. Air enters the circular bladder area from the support core air passage 62 and inflates the bladder 67. FIG. 8 shows the cross sectional end view of the bladder 67 and support core 87 with the bladder inflated. The inflation of the bladder displaces the soft bread core outward. This displacement instantly compresses the soft bread between the bladder and the surrounding seat 37 and cover 54. The cover must be held down by hand to resist the compressive force.

The bladder can be immediately deflated by releasing the air. Air is released by allowing the cover to open slightly which in turn withdraws the plug 63 from the air hole 64. The air pressure escapes through hole 64 and the bladder 67 deflates to its relaxed position shown in FIG. 7. The compressed bread retains its shape in FIG. 8. The deflated mandrel is now free to be withdrawn from the completed bread casing 13 by pushing on knob 75 in the reverse direction of 56. As the mandrel arm is moved back, the center section 74 of the arm moves along cam surface 77. At the back most position, the arm moves up along the cam incline 76 to its full back and up rest position.

The completed bread casing 13 may now be removed. Open lid 54 and insert finger in recess 38 of seat 37. Pry bread roll up and out with finger.

Figure 9:
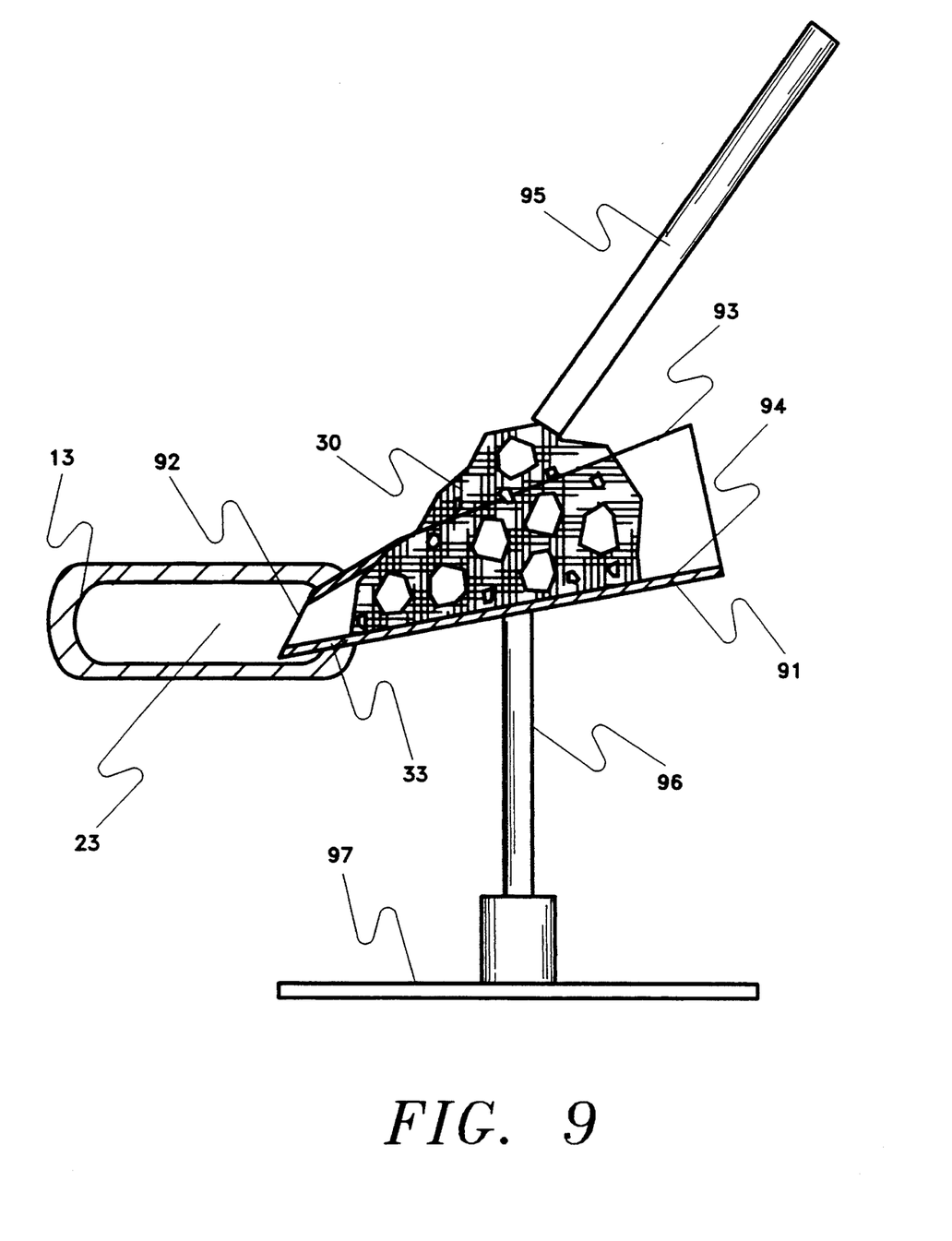
FIG. 9 is a fragmentary pictorial illustration of the apparatus that is used to inject a filling material into the FIG. 1 sandwich casing.

The final step for sandwich preparation is to inject the edible filler into the hollow bread casing. FIG. 9 shows a funnel-type device embodying the present invention. The discharge end 92 of the funnel 91 is a cone shape truncated at an oblique angle to provide an inclined opening about 1 ¼" in diameter through which the filler can be pushed. The cone is reclined and has the top side 93 almost fully removed to provide an exposed bottom surface 94 onto which the filler 30 can be placed. A support tube 96 is affixed to the bottom side of the funnel. A weighted stand 97 with tube socket holds the funnel in position as the bread casing 13 is filled.

The slit area 33 of the bread casing 13 is slipped over the discharge end 92 of the funnel 91. A round, square-end rod 95 is used to push the filler through the discharge end of the funnel 91 into the bread casing cavity 23. When filled, the bread casing is removed from the funnel discharge and the narrow slit 33 is returned to a closed position to create the completed sandwich 14.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. An apparatus for making a fillable sandwich roll from a one piece pre-baked soft bread casing having two major faces, a soft core, a peripheral edge, said apparatus comprising:

a housing having a slot, said slot having upper and lower cam surfaces; said housing also having a circular seat for holding said bread casing and having an integral key-hole shaped cam surface corresponding to the peripheral edge of said bread casing, said key-hole shaped cam surface located beneath said circular seat, with said key-hole shaped cam surface defining a cutting plane;

a first rigid member, having a knife end and a pivotal end, said first rigid member having a fixed circular knife blade wheel attached to the knife end, said knife blade wheel having a planar range of motion;

a second rigid member, having a handle end and a pivotal end, said first rigid member having a handle attached to the handle end;

a rod, rigidly aligning said first rigid member and said second rigid member together at their respective pivotal ends, said rod having upper and lower pin-type cam followers, said pin-type cam followers movably attaching said rigid members to said upper and lower cam surfaces in said slot;

a roller-type cam follower, attached to said second rigid member, and engaging said key-hole shaped cam surface, thereby limiting the range of motion of said circular knife blade wheel to said cutting plane such that when said handle is pulled, said circular knife blade cuts through a section of the peripheral edge of said casing and into the soft core to form a planar key-hole shaped slit within said casing, with said planar key-hole shaped slit interposed approximately equidistant from the two major faces of said casing;

an expandable mandrel, movably attached to said housing, said mandrel having a flat circular bladder, said bladder dimensioned to fit within the key-hole shaped slit within said casing;

means for pumping air, connected to said mandrel, for expanding said bladder to form a cavity of compressed soft core within said casing when said bladder is placed within said planar key-hole shaped slit, said cavity having a substantially uniform wall thickness and approximately centered between said two major faces within said casing, wherein a fillable sandwich roll is obtained that can be filled with an edible filling that is substantially uniformly surrounded by compressed soft core.

2. The apparatus of claim 1 further comprising funnel means for injecting an edible filling through the slitted section of the peripheral edge of said casing into the cavity within said casing.

3. The apparatus of claim 2, wherein said means for pumping air is a manually operated pump.

4. The apparatus of claim 3 further comprising a compressive cover attached to said housing for holding said casing to resist the compressive force exerted by said pumping means such that said bread casing is prevented from rupturing during the formation of the cavity within said casing.

* * * * *